United States Patent
Aswell

(10) Patent No.: US 7,620,291 B1
(45) Date of Patent: Nov. 17, 2009

(54) AUTOMATIC CALIBRATION CIRCUIT FOR OPTOELECTRONIC DEVICES

(75) Inventor: Cecil Aswell, Orangevale, CA (US)

(73) Assignee: Texas Advanced Optoelectronic Solutions, Inc., Plano, TX (US)

( * ) Notice: Subject to any disclaimer, the term of this patent is extended or adjusted under 35 U.S.C. 154(b) by 26 days.

(21) Appl. No.: 11/391,113

(22) Filed: Mar. 28, 2006

Related U.S. Application Data

(60) Provisional application No. 60/665,854, filed on Mar. 29, 2005.

(51) Int. Cl.
*G02B 6/00* (2006.01)

(52) U.S. Cl. .......................... 385/147; 385/15; 385/39; 385/40

(58) Field of Classification Search ................ 385/15, 385/39, 40, 147
See application file for complete search history.

(56) References Cited

U.S. PATENT DOCUMENTS

| | | | |
|---|---|---|---|
| 5,550,362 A | | 8/1996 | Sherman |
| 5,838,076 A | * | 11/1998 | Zarrabian et al. ............ 307/115 |
| 6,031,217 A | * | 2/2000 | Aswell et al. ............. 250/208.1 |
| 6,097,021 A | | 8/2000 | Aswell et al. |
| 6,150,714 A | * | 11/2000 | Andreycak et al. .......... 257/690 |
| 6,596,981 B1 | | 7/2003 | Aswell et al. |
| 6,806,771 B1 | * | 10/2004 | Hildebrant et al. .......... 330/284 |
| 7,019,589 B1 | * | 3/2006 | Wiles et al. .................... 330/86 |
| 7,167,280 B2 | * | 1/2007 | Bogdanowicz et al. ...... 358/406 |
| 7,432,825 B2 | * | 10/2008 | Chan et al. ............. 340/870.17 |

\* cited by examiner

*Primary Examiner*—Jennifer Doan
(74) *Attorney, Agent, or Firm*—Locke Lord Bissell & Liddell, LLP

(57) ABSTRACT

A circuit for calibrating optoelectronic devices automatically trims a light sensor based upon a known light condition.

20 Claims, 7 Drawing Sheets

AUTOMATIC CALIBRATION CIRCUIT FOR OPTOELECTRONIC DEVICES

RELATED APPLICATION

This application claims the benefit of U.S. Provisional patent application Ser. No. 60/665,854 filed Mar. 29, 2005 and entitled "Integrated Analog Light Sensor with Adjustable Adaptive Response Speed and Internal Closed Loop Calibration Capability."

TECHNICAL FIELD OF THE INVENTION

The present invention relates to optoelectronic devices, and more particularly to an automatic calibration circuit for optoelectronic devices.

BACKGROUND OF THE INVENTION

Optoelectronic devices, generally include devices that generate and transmit light, amplify light, detect light and control light. Such devices include, for example, ambient light sensors, color control sensors and color temperature sensors. Optoelectronic devices include components which are subject to manufacturing tolerances which cause variations in operational performance. It is therefore necessary to utilize calibration circuitry to compensate for variations in unit to unit performance and manufacturing tolerances.

It has been know in the past to provide optoelectronic devices with adjustable components whose settings are optimized by human technicians before such devices are fully utilized. Potentiometer adjustment as well as other manual-type adjustments have been utilized including the manual soldering or unsoldering of solder links. However, this procedure is time consuming, expensive and unreliable for performing consistent calibration.

A need has thus arisen for an automatic calibration circuit for optoelectronic devices that performs automatic and uniform control for optoelectronic devices.

SUMMARY OF THE INVENTION

In accordance with the present invention, a circuit for calibrating optoelectronic devices is provided which automatically trims a light sensor based upon a known light condition.

In accordance with another aspect of the present invention, calibration of an optoelectronic device is provided automatically by an on-chip calibration circuit using a closed loop gain system that adjusts amplifier gain until an output voltage matches a target value for a known light intensity.

In accordance with another aspect of the present invention, a circuit for calibrating an optoelectronic device includes the use of a programmable memory for performing calibration of the device.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
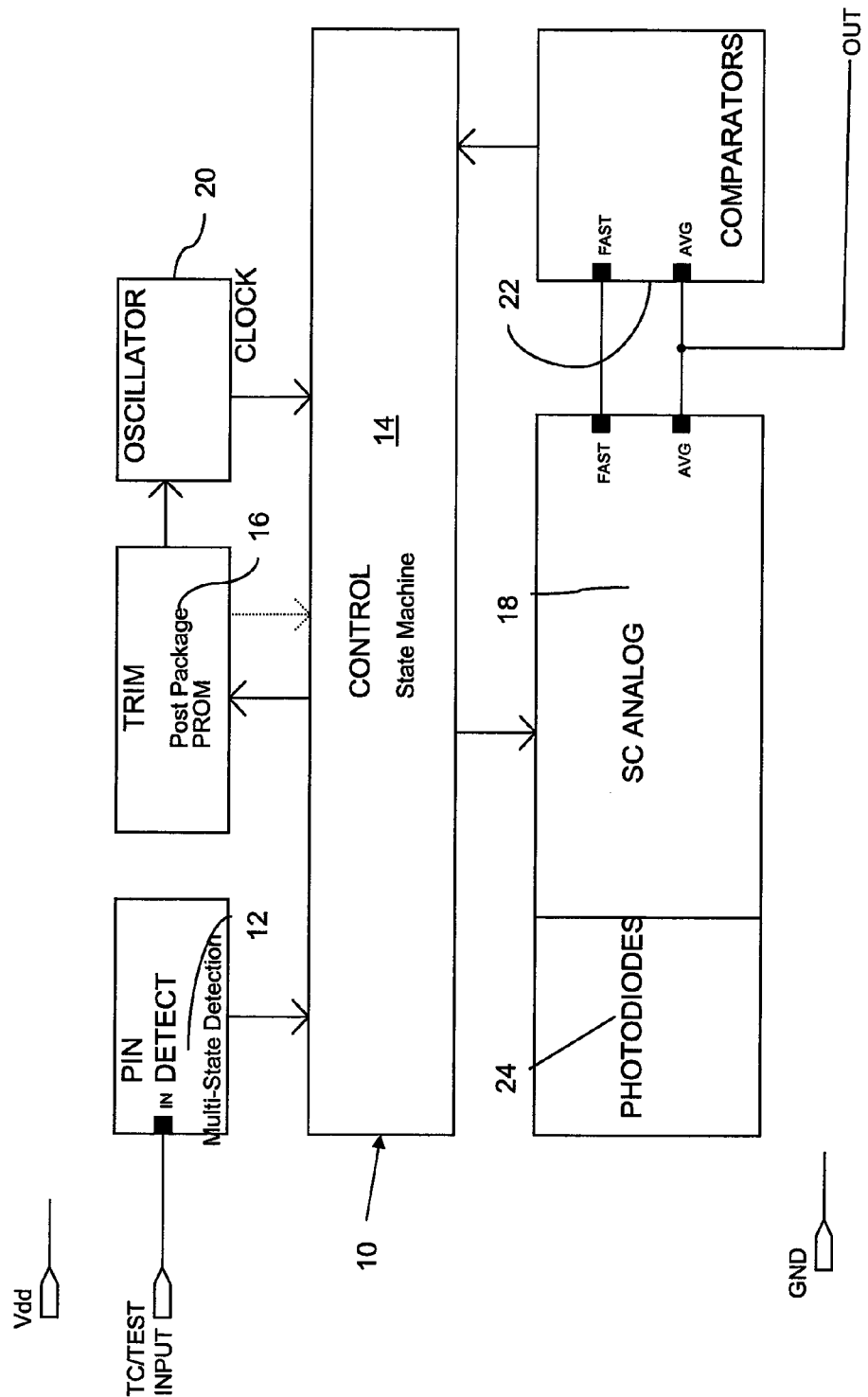
FIG. 1 is a block diagram of the present automatic calibration circuit.
Figure 2:
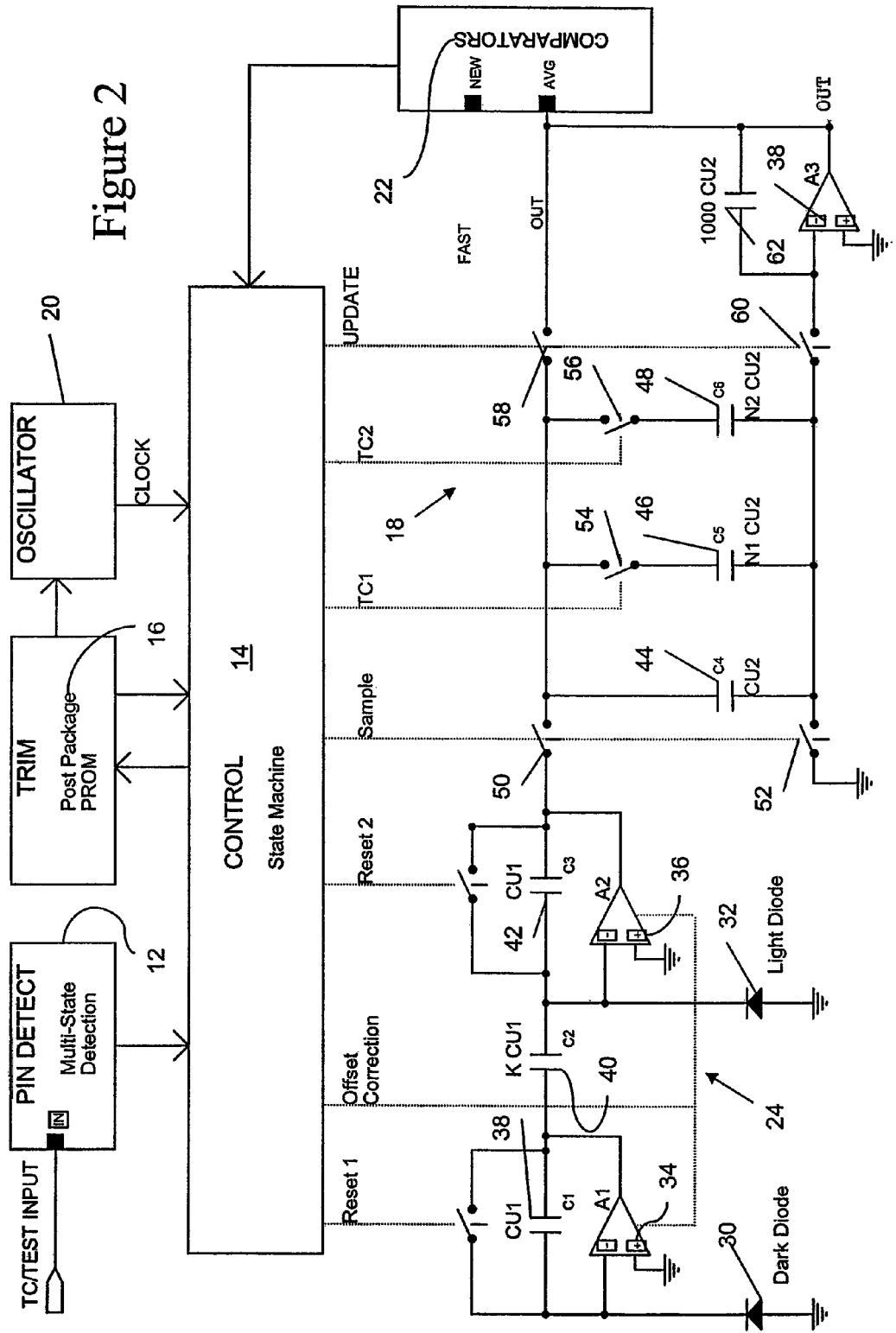
FIG. 2 is a detailed schematic block diagram of the present automatic calibration circuit.

Referring simultaneously to FIGS. 1 and 2, the present automatic calibration circuit for use with optoelectronic devices is provided, and is generally identified by the numeral 10. Circuit 10 enables on-chip circuitry which permits the optoelectronic device to be calibrated post packaging, after installation in a target application. The present circuit 10 includes a calibration loop and programmable memory to enable calibration to be carried out in a simple and cost effective manner. The present circuit 10 ensures, that utilizing a known light source, a known response will be generated regardless of manufacturing tolerances of the optoelectronic device. The present circuit 10 enables repeatable performance and predictable results in view of manufacturing tolerances that influence various operational performance factors of the optoelectronic device.

Circuit 10 may be fabricated in a monolithic integrated circuit which utilizes both analog and mixed signal techniques, however, the present circuit 10 is not limited to a monolithic circuit.

In FIG. 1, the designation Vdd represents power; Gnd represents ground potential; OUT represents the voltage output representative of the time-filtered photonic light level; and TC/Test Input represents the multi-function state machine control pin.

Circuit 10 includes a pin detect block 12 which detects which of several states of the TC/Test pin is in, and presents the result to a control state machine block 14. In normal operation the input states to pin detect 12 are, high (Vdd), low (Gnd) or open. In a test mode, the input states are, for example, Vdd+2 volts and Vdd/2 volts.

Control block 14 is a sequential state machine for controlling the actions of a calibration or trim block 16 and a switched capacitor (SC) analog block 18. Inputs to control block 14 are the state of the TC/Test pin as determined by pin detect block 12, a clock (FIG. 3(a)) from an oscillator 20 and results from a comparator block 22. Outputs of control block 14 include switch controls for SC analog block 18 and control signals for trim block 16.

Trim block 16 includes a programmable read only memory (PROM) controlled by the inputs from the control block 14. The PROM is used to trim the frequency of oscillator 20 to a desired value. A fuse PROM may be used for the PROM within trim block 16, as well as other programmable, non-volatile memory techniques. A PROM is used to permanently store the results of the automatic sensitivity calibration and also to customize the sensing range of circuit 10.

Circuit 10 includes photodiodes shown in block 24 which may comprise, for example two photodiodes, one of which is sensitive to a broad spectrum of light, including visible and infrared light while the other diode is sensitive primarily to infrared. Photodiodes 24 may include, for example, the optical detector described in U.S. Pat. No. 6,596,981, whose description and drawings are incorporated herein by reference.

SC analog block 18 contains switched capacitor analog circuitry for integrating, differencing and time averaging of the photodiode currents produced by photodiodes 24. SC analog 18 produces two outputs, AVG and FAST. AVG is the time average output of circuit 18 and FAST is the signal that is averaged.

Comparator block 22 performs two functions. A first function is to compare the averaged (AVG) output SC analog block 18 (the device output) with a known reference, such as, for example, nominally 80% of Vdd, during the calibration cycle. A second function of comparator 22 is to window compare the FAST signal and the AVG signals from SC analog block 18. The output of the window comparator signals provides an input to control block 14. (The FAST signal is either above or below AVG by a predetermined percentage of the value of AVG.)

The normal operation of circuit 10, the OUT pin at SC analog block 18 presents a voltage, or optionally, a current, that is proportional to the level of the photonic component of light shining on photodiodes 24. The TC/Test pin is used to select the time response of the output. TC/Test pin is responsive to, for example, one of three logic states for operation: high, low or open, corresponding to one of three device operating states.

In the first operating state, minimal filtering is done on the output signal. This state is used for applications that do not require time filtering. In a second state, a nominal single pole filter is used to reduce AC ripple and time average the output signal. In the third operating state, the output adaptively changes its time response depending on the duration of variation in light input. This function is accomplished by switching time Constance on the low pass filter as a function of the amplitude and duration of the light level change.

After circuit 10 is mounted in an application assembly, TC/Test pin is set to still another state to enable a closed-loop calibration cycle performed by circuit 10. This setting is, for example, nominally 2 volts above Vdd. When in this mode, the output of circuit 10 is compared to an internal reference, nominally a fraction of Vdd, while subjected to a known light intensity. A closed feedback loop within the circuit 10 adjusts the gain of the sensor, such that the output matches the internal reference. In this manner, the light to voltage gain of the device can be set to a known value.

After sufficient time has passed, for the calibration loop to settle, the internal PROM within trim block 16 is programmed by serial command input via the TC/TEST pin. This function initiates a programming sequence that stores the gain settings and, optionally, inhibits further programming of a PROM within trim block 16. Calibration in this manner corrects not only errors in the sensor associated with circuit 10, but in the optical path of the assembly as well.

In order to test the analog calibration range of circuit 10, TC/Test pin is sensitive to yet another state, namely being forced midway between Vdd and Gnd. In this state, the calibration loop is enabled but PROM within trim 16 is not programmed when the state is excited.

The five state input TC/TEST pin can be established in other manners, such as comparing the input level to an internal voltage divider across Vdd to select one of multiple logic states. TC/Test inputs can be sequenced to initiate other test modes as well, such as built-in-self-test of internal logic.

Referring now to FIG. 2, a functional block diagram of circuit 10 which expands photodiode block 24 and SC analog block 18, is illustrated. Photodiode block 24 includes a dark diode 30 and a light diode 32. Dark diode 30 is responsive primarily to infra-red wavelengths of light. Light diode 32 is responsive to both visible and infra-red light. An approximation of the photonic response can be made by subtracting the response of dark diode 30 from the response of light diode 32 in the appropriate ratios. The output of a photodiode is a current proportional to the light intensity.

Amplifiers A1, 34; A2, 36; and A3, 38 are operational amplifiers. Amplifiers 34 and 36 may optionally be offset corrected to reduce the effects of dark currents in photodiodes 30 and 32.

Photodiode block 24 includes capacitors C1, 38; C2, 40; and C3, 42. Capacitors 38, 40 and 42 are ratioed unit capacitors where CU1 represents a unit capacitor of 1 value and CU2 represents a different value unit capacitor. Value K represents a fixed scaling factor.

Figure 3:
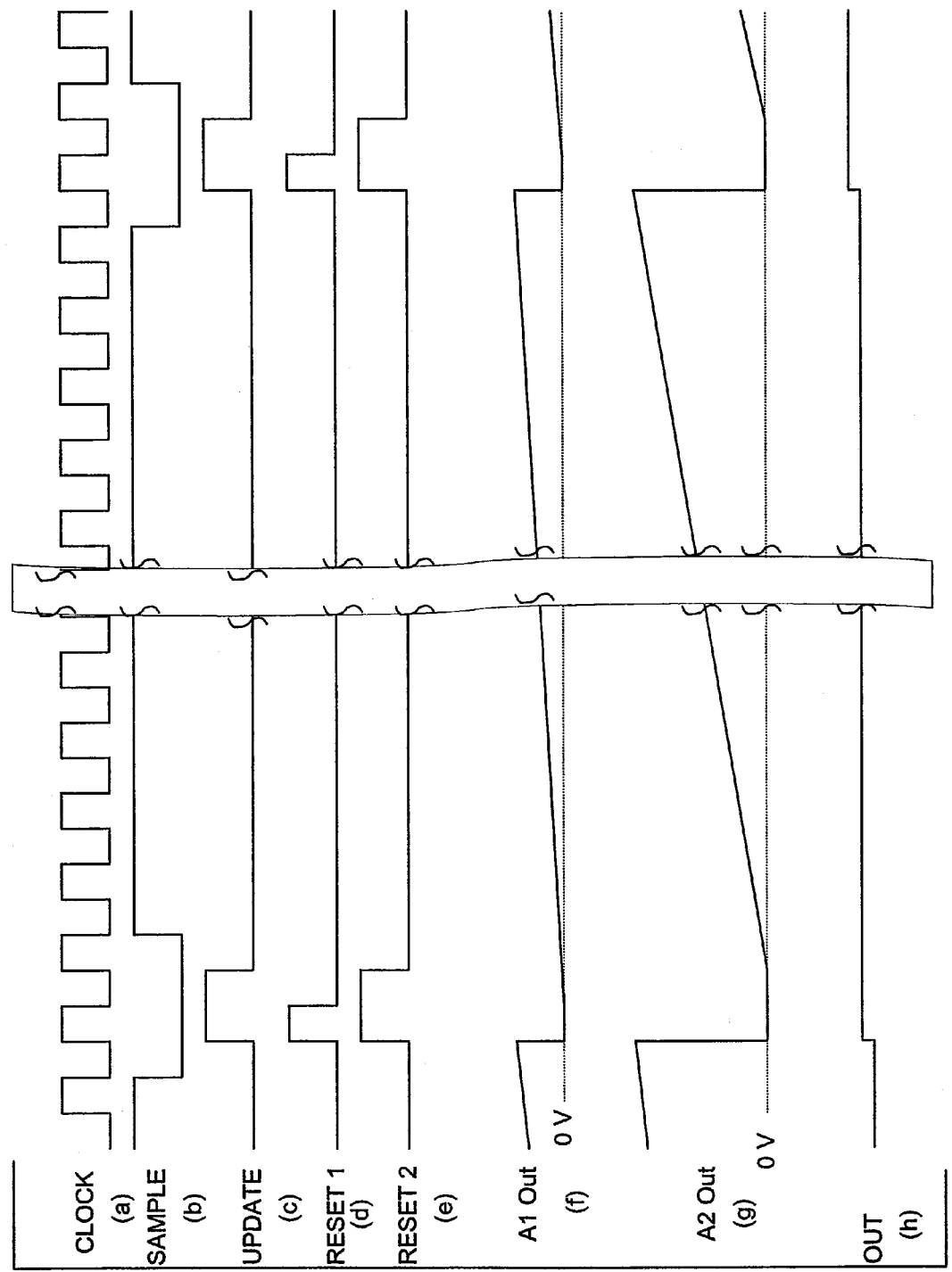
FIG. 3 illustrates a functional timing diagram for the switched capacitor analog block.

In operation of control block 14, block 14 outputs a repetitive cycle of control signals to switch capacitor analog block 18 represented by reset 1 signal (FIG. 3(d)), reset 2 signal (FIG. 3(e)), sample signal and update signal (FIG. 3(c)). The period of cycle is typically in the range of, for example, 10-12 milliseconds. In addition, non-cyclic signals TC1 and TC2 are used to select the time response of the output, OUT (FIG. 3(h)).

Switched capacitor analog block 18 includes capacitors C4, 44; C5, 46; and C6, 48. Switched capacitor analog block 18 further includes switches 50, 52, 54, 56, 58, and 60. Switched capacitor analog block 18 further includes capacitor 62.

In operation, at the end of reset 1, integrator A1 composed of amplifier 34 and capacitor 38 begins integrating photocurrent from dark diode 30 (FIG. 3(f)). At the end of reset 2, integrator A2, composed of amplifier 36 and capacitor 42 begins integrating photocurrent from light diode 32 (FIG. 3(g)). The voltage at the output of amplifier 36 is proportional to the integrated photocurrent of light diode 32 minus K times the integrated photocurrent during the A2 integration period.

The voltage at the output of A2 is sampled by capacitor 44, and according to the states of TC1 and TC2, capacitor 46 and capacitor 48, by signal, sample (FIG. 3(b)).

When signal UPDATE, is active the charge on capacitor 44 and, according to the states of TC1 and TC2, capacitors 46 and 48, is shared with the charge on capacitor 62.

The voltage at the output of amplifier 38 will approach the output of amplifier 36 in a discreet time exponential manner. The time rate of the exponential will be determined capacitor 62, capacitor 44 and, according to the states of TC1 and TC2, capacitors 46 and 48. The slowest time constant will be when TC1 and TC2 are inactive and the fastest time constant will be when TC1 and TC2 are both active.

Comparator block 14 performs a window comparison of the FAST and OUT analog signals. At the end of the integration cycle, the state of comparative block 22 is sampled by control block 14 to determine if the current light level is significantly different, beyond a predetermined percentage, from the averaged OUT value. If a significant difference exists, the control block state machine 14 will change the states of TC1 and TC2 according to a predetermined algorithm. One such algorithm is to speed up the time constant after a fixed number of consecutive significant differences, and then to change to a slow time constant when the difference is no longer significant.

Figure 4:
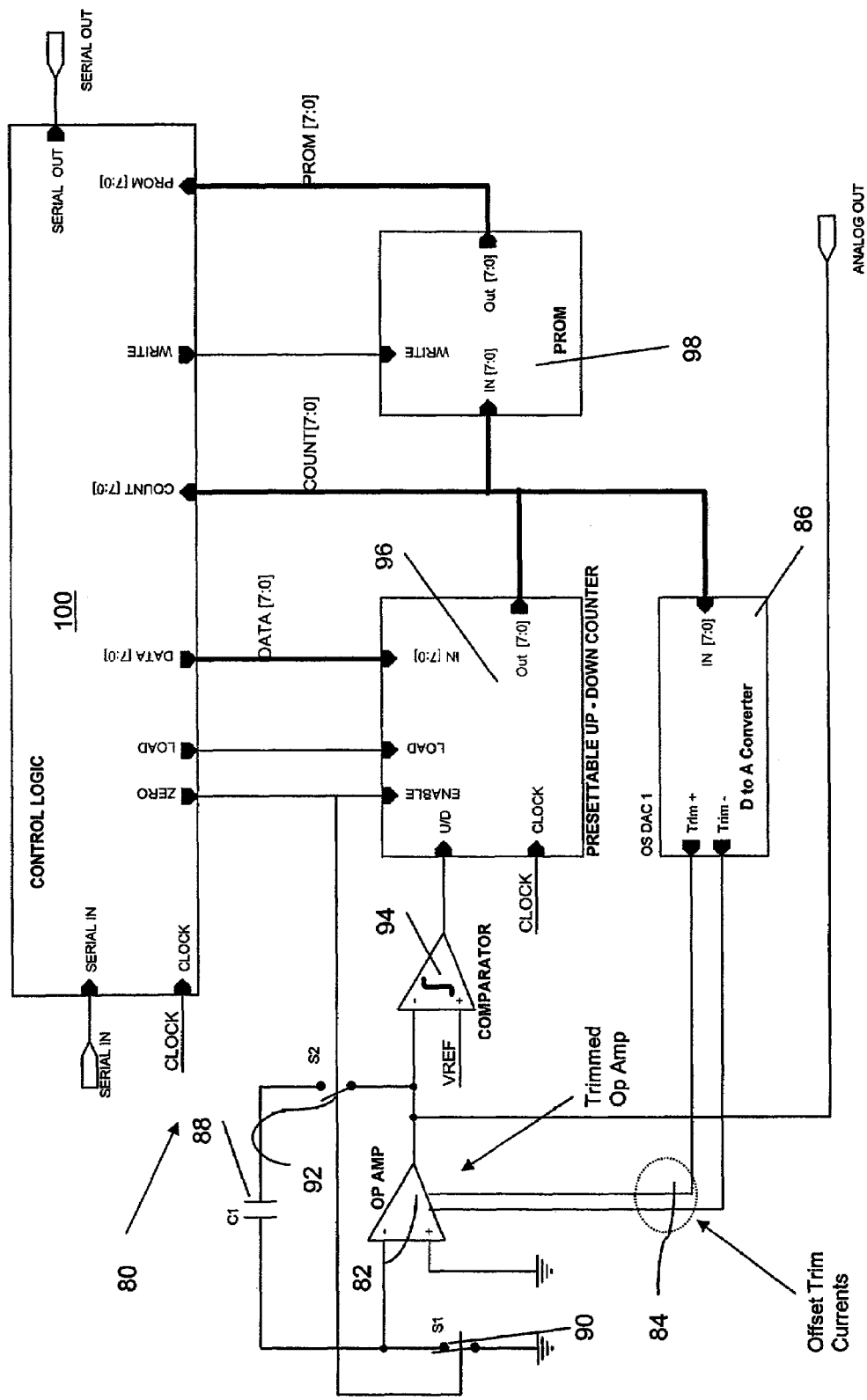
FIG. 4 is a schematic block diagram of the present offset trim loop.

Referring now to FIG. 4, offset correction for operational amplifiers within circuit 10 is accomplished by injecting currents into internal nodes of the amplifier that are reflected in a proportional offset voltage at the inputs of the operational amplifier. The trim currents can be developed from trim resistors, or from a digital to analog converter (DAC). FIG. 4 illustrates an offset trim loop circuit 80 having an operational amplifier 82 which has offset trim inputs 84. Circuit 80 includes a digital to analog converter 86 for providing offset trim currents to operational amplifier 82. Circuit 80 includes a feedback network represented by a capacitor C1, 88. Switches S1, 90 and S2, 92 are used for shorting the input to amplifier 82 and removing the load of the feedback network, respectively.

Circuit 80 includes a comparator 94 for comparing the output of amplifier 82 to a reference voltage VREF. The output of comparator 94 is applied to a presetable up-down counter 96. Counter 96 includes a clock input for system clock. The U/D input controls the direction of the counter 96. The ENABLE Signal, when the counter is active, will increase or decrease the count according to the state of the U/D input. IN[7:0] represents parallel inputs for presetting the counter value. The data at IN[7:0] is loaded into the respective bits of the counter when the LOAD signal is active. OUT[7:0] is the counter state output.

The output of counter 96 is applied to a programmable read only memory 98 at pin IN[7:0] which is the data to be written into PROM 98. The WRITE pin, when active the data at IN[7:0] is programmed into PROM 98. The OUT[7:0] pin is the data representing the state of the PROM bits which is applied to a control logic state machine 100.

Control logic state machine 100 functions to control the action of the offset trim loop circuit 80. Control logic state machine 100 responds to an input SERIAL IN to perform any of the following actions: load the counter 96 with data received at SERIAL IN, initiate a closed-loop offset correction cycle, load the counter 96 with the state of PROM 98, program PROM 98 with the state of counter 96, and output the state of counter 96 on SERIAL OUT.

A closed-loop offset correction cycle performed by circuit 80 begins as follows. In response to a SERIAL input command, switch 90 is closed, shorting the inputs of amplifier 82. Switch 92 opens, removing the feedback network load from the output of amplifier 82. The counter 96 ENABLE signal is asserted, allowing counter 96 to count up or down in response to the state of comparator 94. The combination of the amplifier 82, counter 96 and converter 86 form a negative feedback loop so counter 96 will drive converter 86 to produce a minimum offset voltage in amplifier 82. When the amplifier 82 offset is at a minimum, the counter 96 will toggle between two counts in a limit cycle.

A subsequent SERIAL command stops counter 96. Another SERIAL command programs the value of counter 96 output to PROM 98.

Normal operation resumes by opening switch 90 and closing switch 92 and loading the value of PROM into counter 96. In normal operation, the value latched into counter 96 is static, that is, the ENABLE pin is inactive and no further up/down action takes place. Counter 98 functions as a static register.

The number of bits shown in circuit 80 is 8, this number is shown as an example, and any number of bits can be utilized. Counter 96 is shown for illustrative purposes, other types of control registers, can be utilized in circuit 80. Although an internal state machine to control the closed loop action is shown in FIG. 4, it is also possible to use external devices to control the loop and set the counter value controlling offset of operational amplifier 82.

Figure 5:
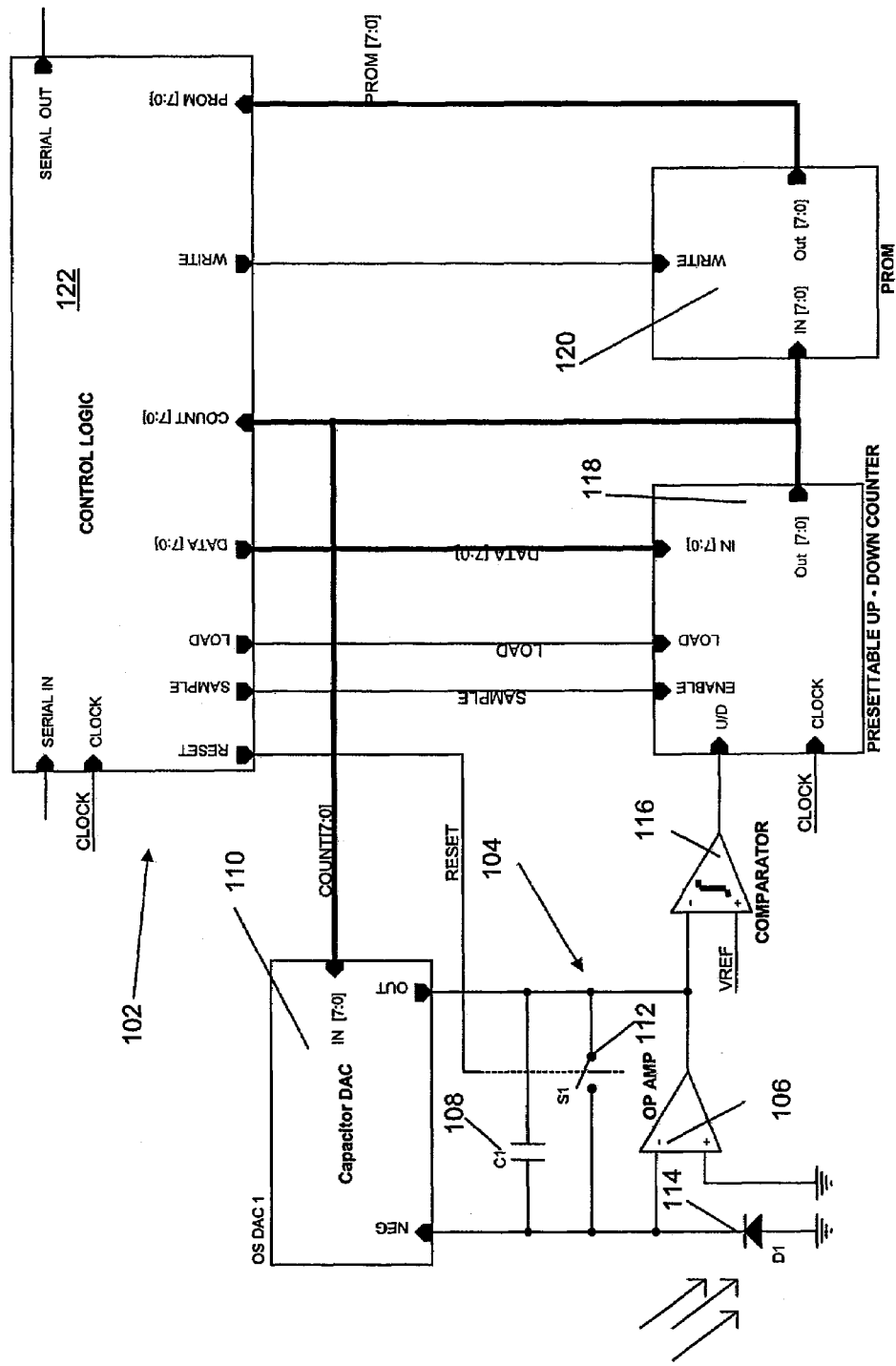
FIG. 5 is a schematic block diagram of the present gain trim loop.

Referring now to FIG. 5, the gain trim loop circuit for gain calibration of circuit 10 is illustrated, and is generally identified by the numeral 102. Circuit 10 includes an integrator, generally identified by the numeral 104 which includes an operational amplifier 106 and a capacitor feedback network including a fixed capacitor, C1, 108 and a capacitor digital to analog converter (DAC) 110. DAC 110 typically is a switched binary weighted capacitor array. The capacitance of DAC 110, in parallel with capacitor 108 sets the gain of integrator 104. A switch S1, 112 is used for resetting integrator 104. An input to amplifier 106 is from a diode 114 which is responsive to light which generates photocurrent to be integrated by integrator 104.

The output of amplifier 106 is supplied to a comparator 116 for comparing the output of amplifier 106 to a fixed reference voltage VREF. The output of comparator 116 is supplied to a presettable up/down counter 118. The pins of counter 118 include a clock for the system clock; U/D, controls the direction of counter 118; ENABLE, when active, the counter 118 will increase or decrease according to the state of the U/D input; IN[7:0], represents parallel inputs for presetting the value of counter 118; LOAD, when active, the data at IN[7:0] is loaded into the respective bits of counter 118; and OUT[7:0] is the counter 118 state output.

The output of counter 118 is applied to a programmable read only memory 120 which has an input IN[7:0] for data to be written to PROM 120; WRITE, when active, the data IN[7:0] is programmed in PROM 120; and OUT[7:0] is data representing the state of the PROM 120 bits which is output to a control logic state machine 122.

Control logic state machine 122 controls the action of trim loop circuit 102, in response to input SERIAL IN to perform any of the following actions: load counter 118 with data received on SERIAL IN; initiate a closed-loop gain correction cycle, load counter 118 with the state of PROM 120; program PROM 120 with the state of counter 118; and output the state of counter 118 on SERIAL OUT.

In operation of trim loop circuit 102, integrator 104 periodically integrates the photocurrent generated by diode 114. At the end of the integration period, the analog output is sampled by an external circuit and then the integrator 114 is reset by closing switch 112. Switch 112 is opened to repeat the cycle. During operating, counter 118 contains the PROM 120 value, thus DAC 110 is set to the PROM value.

A closed-loop gain calibration cycle proceeds as follows: in response to a serial input command, control logic state machine 122 enables counter 118 at the end of a normal integration cycle by making the ENABLE signal active. Counter 118 will increase or decrease its count according to the state of comparator 116, thus changing the gain of the integrator 104. The combination of the integrator 104, counter 118 and DAC 110 forms a negative feedback loop so that counter 118 will drive DAC 110 to produce an integrator gain, such that for a known light level input, the integrator output will be equal to reference voltage VREF. There can be one or more counts at the end of each integration cycle.

A subsequent SERIAL command stops counter 118. Another SERIAL command programs the value of the counter 118 into PROM 120. Operation resumes by opening switch 112 and loading the value of PROM 120 into counter 118. The value latched into counter 118 is static, that is, the ENABLE pin is inactive and no further up/down action takes place. Counter 118 functions as a static register.

It is also possible to program the gain of DAC 110 by an external control loop. In this method, SERIAL commands set the value of counter 118 and the analog output is monitored by the external control system. The gain of integrator 104 is set to the desired value to give a response to a given level of light input. Circuit 102 includes an up/down counter in a feedback loop, for illustrative purposes only, other types of control registers, such as a successive approximation register can be utilized. Also, the number of bits shown in circuit 102 is for illustration only, the number is arbitrary, and any number of bits can be utilized.

Figure 6:
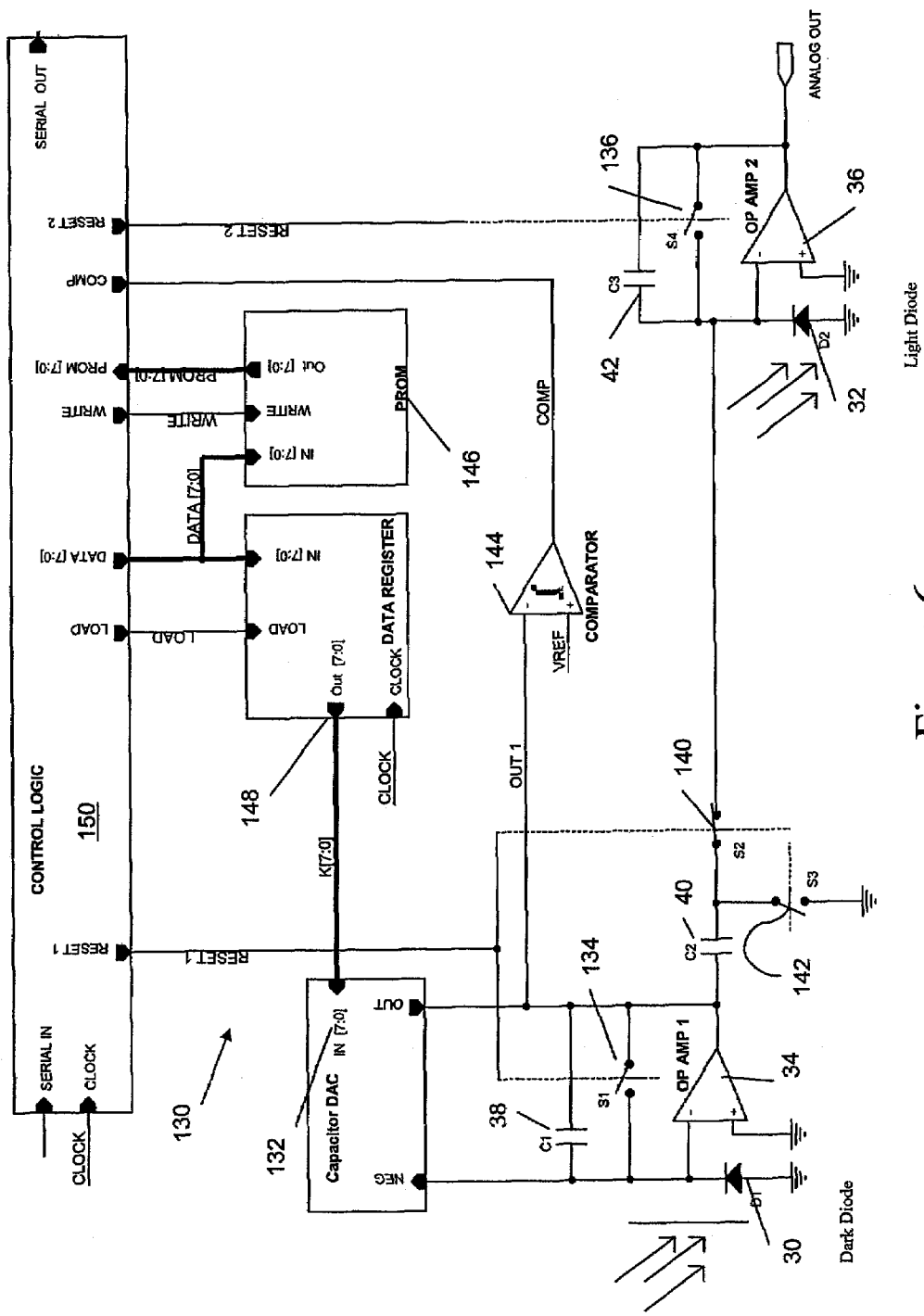
FIG. 6 is a schematic block diagram of the present on-chip subtraction of the dark diode signal from a light diode signal.

As previously discussed, with respect to FIG. 2, subtraction of light and dark diode signals is utilized in circuit 10. As described in U.S. Pat. No. 6,596,981, signals from two photodiodes, one of which is sensitive to visible and infra-red (light diode 32) and one which is primarily sensitive to infra-red (dark diode 30) may be processed to provide a light response which approximates the response of the human eye. A calculation for performing this function is to subtract a properly weighted proportion of the dark diode signal from the light diode signal. FIG. 6 illustrates a technique for performing this subtraction function in an integrated circuit, generally identified by the numeral 130. Circuit 130 includes components previously identified with respect to FIG. 2 wherein like numerals are utilized for like and corresponding components. Circuit 130 includes dark diode 30 and light diode 32. A resettable integrator for integrating dark diode 30 includes amplifier 34 and a capacitor feedback network including capacitor 38 and a capacitor DAC 132. DAC 132 is typically a switched binary weighted capacitor array. The capacitance of DAC 132, in parallel with the capacitance of capacitor 38 sets the gain of the integrator. A switch 134 is utilized for resetting the integrator.

Associated with light diode 32 is a resettable integrator which includes amplifier 36, capacitor 42 and a switch 136.

Capacitor 40 and switches 140 and 142 sum the weighted proportion of the output of the dark signal integrator with the light signal integrator.

Circuit 130 includes a comparator 144 for comparing the output of the dark signal integrator to a fixed voltage VREF. Circuit 130 further includes a PROM 146 with pins IN[7:0] dated to be written to PROM 146, WRITE, when active, the data at IN[7:0] is programmable in the PROM 146, and OUT[7:0] data representing the state of the bits of PROM 146. Input to PROM 146 is from a data register 148 for storing a digital word which controls the setting of DAC 132.

Circuit 130 further includes a control logic state machine 150 for controlling action of circuit 130. Control logic state machine 150 responds to input SERIAL IN to perform the following actions: load data register 148 with data received on SERIAL IN; load data register 148 with the state of PROM 146; program PROM 146 with the state of data register 148; output the state of data register 148 on SERIAL OUT; control the reset of the integrators with signals RESET1 and RESET2; and sense the state of comparator 144 and initiate appropriate reset sequences.

Circuit 130 operates in a cycle of repeating integrating cycles. At the end of each cycle, the analog output is sampled by an external circuit. An integration cycle is initiated by resetting the integrator and capacitor 40. This function is accomplished by closing switches 134, 142 and 136. With these switches open, switch 140 is closed. Amplifier 34 then integrates the dark diode signal and amplifier 36 integrates the light diode signal.

The output of amplifier 34 is the integrated current from diode 30 divided by the capacitance of the feedback network comprising capacitor 38 in parallel with DAC 132. The output of amplifier 36 is the integrated current from diode 32 divided by feedback capacitor 42 minus the charge coupled into the summing node through capacitor 40. The output of amplifier 36 is given by:

Analog out=$(I_L - K*I_D)/C3$, where:

$I_D$=dark diode current; $I_L$=light diode current; K=C2/CF1; and CF1 is the parallel capacitance of DAC 132 and capacitor 38.

Therefore, the amount of dark diode current that is subtracted from light diode current can be controlled by setting of DAC 132.

It is possible for amplifier 34 output to increase at a faster rate than the output of amplifier 36. Therefore, operational amplifier 34 could reach saturation before amplifier 36 reaches saturation. The purpose of comparator 144 and voltage reference VREF is to assure that amplifier 34 will never saturate in normal operation.

If the output of amplifier 34 reaches comparator 144 threshold before the end of the integration cycle, a dark integrator reset is initiated. In this event, control logic state machine 150 asserts signal RESET1 for a very short period. This function opens switch 140 and closes switches 134 and 142 in a non-overlapping manner. As a result, dark diode current integrator is reset and discharges capacitor 40. RESET1 is de-asserted and integration of dark diode current (and proportional subtraction from light diode current) resumes.

The charging current through capacitor 40 depends only on the time rate of voltage across capacitor 40 which is simply the time rate of change of the output of amplifier 34. Since capacitor 40 is disconnected from amplifier 36 during the short reset cycle, there is no significant disruption in the amount of current being subtracted from light diode current integrator.

Figure 7:
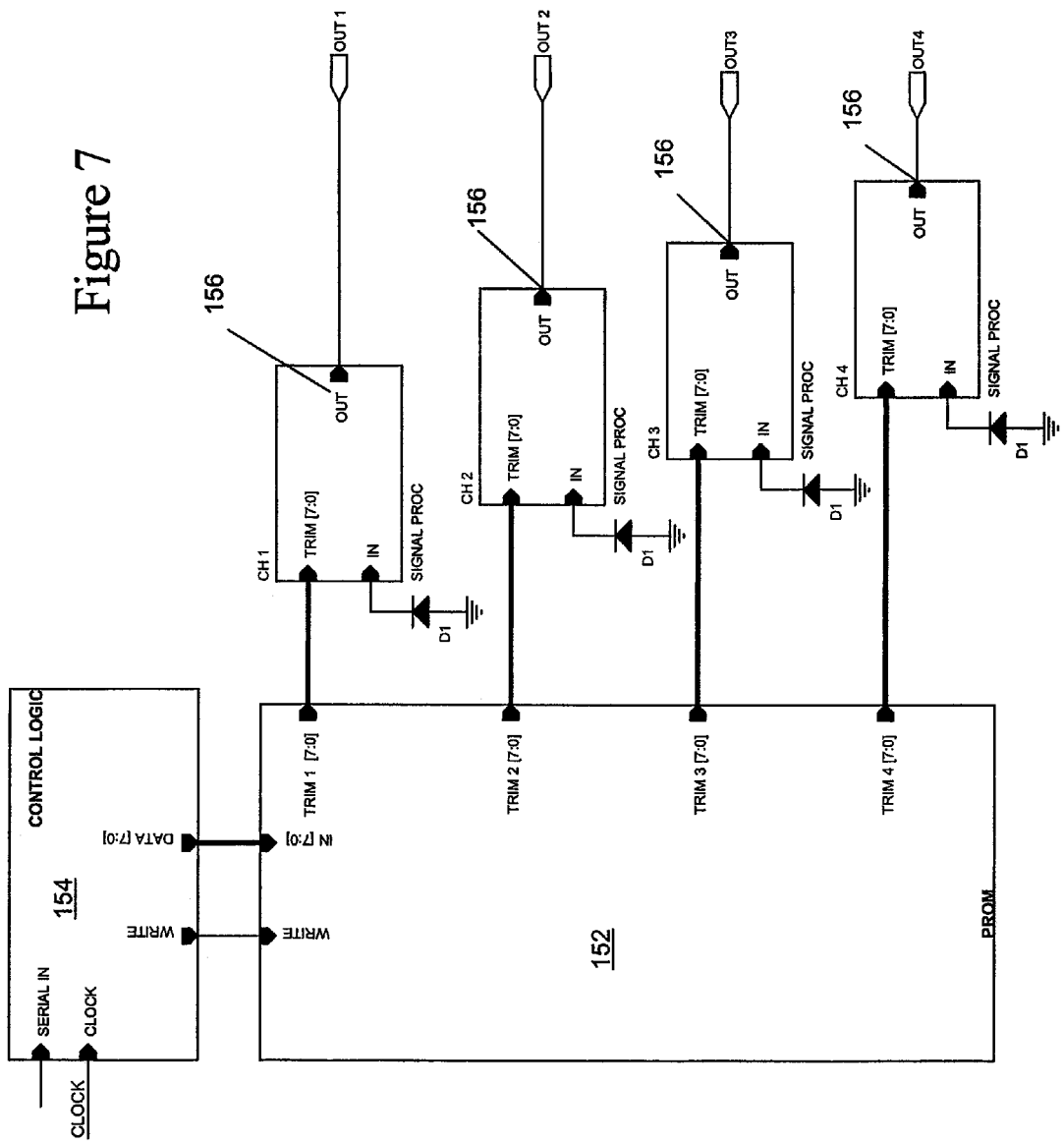
FIG. 7 is a block diagram of a multi-channel optical sensor with trim in accordance with the present invention.

Referring now to FIG. 7, a multi-channel optoelectronic sensor with trim is illustrated. The trim is shown as a bit per channel for illustrative purposes only. The circuit includes a PROM 154, control logic state machine 154 and multiple signal processing blocks 156. The purpose of the trim is to ensure that selected parameters of the individual signal processing blocks can be adjusted so that the relative as well as absolute characteristics of the blocks meet predetermined requirements.

It therefore can be seen that the present automatic calibration circuit provides in-package trim capability, device-to-device and system-to-system tolerance which can be minimized allowing for very precise repeatability. An internal fuse-PROM can be utilized to permanently store the result of the automatic sensitivity calibration and also used to customize the sensing range of the optoelectronic device.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A circuit for automatic calibration of a post packaged optoelectronic device color control sensor, the circuit comprising:
   a trim circuit contained on the optoelectronic device color control sensor and operable to automatically trim a light sensor based upon a known light condition, said trim circuit including a plurality of fuses, each of said fuses having a state controlled by power switches set by a control circuit.

2. The circuit of claim 1 wherein the trim circuit includes a closed loop gain circuit.

3. The circuit of claim 1 wherein the trim circuit includes an on-chip/subtractive circuit of a dark diode signal from a light diode signal.

4. The circuit of claim 1 wherein the trim circuit includes an amplifier offset correction circuit.

5. The circuit of claim 1 wherein the trim circuit includes an amplifier gain trim loop.

6. The circuit of claim 1 wherein the optoelectronic device includes a multiple element optical sensor.

7. The circuit of claim 1 wherein the circuit is fabricated on a single monolithic die.

8. The circuit of claim 1 wherein the circuit operates with a single voltage level.

9. The circuit of claim 1 including a single input/output communications pin having multiple states.

10. The circuit of claim 1 wherein the circuit includes a programmable device, programmable by an end user.

11. A circuit for automatic calibration of a post packaged optoelectronic device color temperature sensor, the circuit comprising:

a trim circuit contained on the optoelectronic device color temperature sensor and operable to automatically trim a light sensor based upon a known light condition, said trim circuit including a plurality of fuses, each of said fuses having a state controlled by power switches set by a control circuit.

12. The circuit of claim 11 wherein the trim circuit includes a closed loop gain circuit.

13. The circuit of claim 11 wherein the trim circuit includes an on-chip/subtractive circuit of a dark diode signal from a light diode signal.

14. The circuit of claim 11 wherein the trim circuit includes an amplifier offset correction circuit.

15. The circuit of claim 11 wherein the trim circuit includes an amplifier gain trim loop.

16. The circuit of claim 11 wherein the optoelectronic device includes a multiple element optical sensor.

17. The circuit of claim 11 wherein the circuit is fabricated on a single monolithic die.

18. The circuit of claim 11 wherein the circuit operates with a single voltage level.

19. The circuit of claim 11 including a single input/output communications pin having multiple states.

20. The circuit of claim 11 wherein the circuit includes a programmable device, programmable by an end user.

* * * * *